United States Patent
Nagaoka et al.

(10) Patent No.: US 9,090,205 B2
(45) Date of Patent: Jul. 28, 2015

(54) LIGHT DISTRIBUTION CONTROLLER

(71) Applicant: HONDA MOTOR CO., LTD, Tokyo (JP)

(72) Inventors: Nobuharu Nagaoka, Wako (JP); Hiroyuki Koike, Wako (JP); Yusuke Nakamura, Wako (JP); Makoto Aimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 108 days.

(21) Appl. No.: 13/927,156

(22) Filed: Jun. 26, 2013

(65) Prior Publication Data

US 2013/0343071 A1  Dec. 26, 2013

(30) Foreign Application Priority Data

Jun. 26, 2012  (JP) ................................. 2012-143542

(51) Int. Cl.
| | |
|---|---|
| *B60Q 1/00* | (2006.01) |
| *G08G 1/00* | (2006.01) |
| *G06K 9/00* | (2006.01) |
| *B60Q 1/08* | (2006.01) |
| *B60Q 9/00* | (2006.01) |

(52) U.S. Cl.
CPC ............... *B60Q 1/085* (2013.01); *B60Q 9/008* (2013.01); *B60Q 2300/45* (2013.01)

(58) Field of Classification Search
None
See application file for complete search history.

(56) References Cited

U.S. PATENT DOCUMENTS

| | | | | |
|---|---|---|---|---|
| 5,515,026 | A | * | 5/1996 | Ewert ........................... 340/436 |
| 6,281,806 | B1 | * | 8/2001 | Smith et al. ................... 340/901 |
| 6,327,536 | B1 | | 12/2001 | Tsuji et al. |

(Continued)

FOREIGN PATENT DOCUMENTS

| | | |
|---|---|---|
| JP | 60-61942 U | 4/1985 |
| JP | 08-006326 Y2 | 2/1996 |

(Continued)

OTHER PUBLICATIONS

"Mercedez-Benz collision avoidance features: initial results," Highway Loss Data Institute, Bulletin, vol. 29, No. 7, Apr. 2012.*

(Continued)

*Primary Examiner* — Matthew Bella
*Assistant Examiner* — Soo Shin
(74) *Attorney, Agent, or Firm* — Westerman, Hattori, Daniels & Adrian, LLP (57) ABSTRACT

A light distribution controller includes a pedestrian detection unit, a determination unit, and an illumination controller. The pedestrian detection unit detects a pedestrian in a predetermined area ahead of a vehicle on the basis of an image captured by an infrared camera. The determination unit determines whether a driver notices the pedestrian when the pedestrian detection unit has detected the pedestrian in the predetermined area, on the basis of whether a predetermined condition is satisfied. The illumination controller causes the headlight to be lit with a light distribution pattern without a restriction on illumination of the pedestrian until the determination unit determines that the driver notices the pedestrian, and causes the headlight to be lit with a light distribution pattern having a restriction on illumination of a body member including at least the eyes of the pedestrian after the determination unit determines that the driver notices the pedestrian.

4 Claims, 6 Drawing Sheets

(56) References Cited

U.S. PATENT DOCUMENTS

| | | | |
|---|---|---|---|
| 6,843,588 B2 | 1/2005 | Iwamoto et al. | |
| 7,575,352 B2 | 8/2009 | Sato et al. | |
| 7,634,341 B2* | 12/2009 | Patchell | 701/45 |
| 7,925,050 B2 | 4/2011 | Nagaoka et al. | |
| 8,164,432 B2* | 4/2012 | Broggi et al. | 340/435 |
| 8,384,534 B2* | 2/2013 | James et al. | 340/439 |
| 8,538,636 B2* | 9/2013 | Breed | 701/49 |
| 2003/0156016 A1* | 8/2003 | Heimburger et al. | 340/425.5 |
| 2004/0201483 A1* | 10/2004 | Stam et al. | 340/600 |
| 2005/0159893 A1* | 7/2005 | Isaji et al. | 701/301 |
| 2009/0010495 A1* | 1/2009 | Schamp et al. | 382/106 |
| 2009/0016073 A1* | 1/2009 | Higgins-Luthman et al. | 362/465 |
| 2009/0147080 A1* | 6/2009 | Inada | 348/77 |
| 2009/0243880 A1* | 10/2009 | Kiuchi | 340/903 |
| 2010/0020170 A1* | 1/2010 | Higgins-Luthman et al. | 348/135 |
| 2011/0234422 A1* | 9/2011 | Yamashita | 340/901 |
| 2012/0045119 A1* | 2/2012 | Schamp | 382/157 |
| 2012/0275172 A1* | 11/2012 | Mizuno | 362/464 |

FOREIGN PATENT DOCUMENTS

| | | |
|---|---|---|
| JP | 2000-225888 A | 8/2000 |
| JP | 2001-006096 A | 1/2001 |
| JP | 2001-328485 A | 11/2001 |
| JP | 2008-113296 A | 5/2008 |
| JP | 2009-48786 A | 3/2009 |
| JP | 2011-084106 A | 4/2011 |
| JP | 2013-086676 A | 5/2013 |

OTHER PUBLICATIONS

Japanese Office Action dated Jan. 28, 2014, issued in corresponding Japanese application No. 2012-143542 (2 pages).

* cited by examiner

LIGHT DISTRIBUTION CONTROLLER

CROSS REFERENCES TO RELATED APPLICATIONS

The present application claims priority under 35 U.S.C. §119 to Japanese Patent Application No. 2012-143542, filed Jun. 26, 2012, entitled "Light Distribution Controller." The contents of this application are incorporated herein by reference in their entirety.

TECHNICAL FIELD

The present disclosure relates to a light distribution controller that is mounted on a vehicle and that controls illumination of a living body which is positioned ahead of the vehicle.

BACKGROUND

Light distribution controllers are known which automatically adjust light distribution of a headlight of a vehicle in accordance with, for example, an angle of turn, the vehicle speed, or the presence or absence of an oncoming car (for example, see Japanese Patent No. 3747738 and Japanese Unexamined Utility Model Registration Application Publication No. 60-61942).

Examples of a known specific structure for controlling light distribution of a headlight of a vehicle include a structure for adjusting the angle and the forward-backward direction position of a concave reflecting mirror in a headlight and a structure for adjusting relative positions of the condenser lens and the diffusion lens which are disposed in front of the light source in a headlight (for example, see Japanese Patent No. 3747738, Japanese Unexamined Utility Model Registration Application Publication No. 60-61942, and Japanese Examined Utility Model Registration Application Publication No. 8-6326).

A light distribution controller is known which, upon detection of a pedestrian, controls the light quantity and the direction of illumination light which is emitted from a headlight to the pedestrian in order to prevent the pedestrian from being dazzled by the glare due to the light from the headlights of a vehicle (for example, see Japanese Patent No. 4178644).

A light distribution controller is known which controls a warning to a driver in accordance with an area in which a pedestrian is present and which is one of multiple areas obtained by dividing an area ahead of a vehicle (for example, see Japanese Patent No. 3515926).

A light distribution controller of the related art (for example, see Japanese Patent No. 4178644) starts restricting illumination of a pedestrian upon detection of the pedestrian. Therefore, there is an advantage for a pedestrian in that the dazzling illumination from a vehicle is immediately avoided. In contrast, there is a disadvantage for a driver to recognize the pedestrian because of a reduced time period in which the pedestrian is illuminated.

SUMMARY

The present application describes a light distribution controller which controls light distribution of a headlight to be adequate for both a pedestrian and a driver.

A light distribution controller according to a first aspect of the embodiment includes a headlight, an image capture unit, a pedestrian detection unit, a determination unit, and an illumination controller. The headlight lights an area ahead of a vehicle in such a manner that light distribution is freely adjustable. The image capture unit is mounted on the vehicle and generates a captured image of the area ahead of the vehicle. The pedestrian detection unit detects a pedestrian in a predetermined area ahead of the vehicle on the basis of the image captured by the image capture unit. The determination unit determines whether or not a driver is aware of the pedestrian in the predetermined area on the basis of whether or not a predetermined condition is satisfied when the pedestrian detection unit has detected the pedestrian in the predetermined area. The illumination controller causes the headlight to be lit with a light distribution pattern having no restrictions on illumination of the pedestrian until the determination unit determines that the driver is aware of the pedestrian in the predetermined area, and causes the headlight to be lit with a light distribution pattern having a restriction on illumination of a body member including at least an eye of the pedestrian after the determination unit determines that the driver is aware of the pedestrian in the predetermined area.

According to the first aspect, the light distribution controller performs light emission with a light distribution pattern having no restrictions on illumination of the pedestrian until it is determined that the driver is aware of the pedestrian in the predetermined area, whereas the light distribution controller performs light emission with a light distribution pattern having a restriction on illumination of the pedestrian after it is determined that the driver is aware of the pedestrian in the predetermined area. This prevents a pedestrian from receiving unnecessary dazzling illumination from a headlight, while achieving a light distribution state for the headlight which is necessary for a driver to recognize the pedestrian.

According to a second aspect of the embodiment, in the light distribution controller according to the first aspect, a first condition or a second condition is set as the predetermined condition. The first condition is that the driver has performed a predetermined driving operation. The second condition is that the light emission from the headlight has been performed with the light distribution pattern having no restrictions on illumination of a pedestrian for a predetermined time period or longer after the pedestrian detection unit detected the pedestrian in the predetermined area ahead of the vehicle.

According to the second aspect, the condition that the driver has performed the predetermined driving operation is set as the predetermined condition, whereby it can be surely determined that the driver is aware of the pedestrian in the predetermined area. The condition that light emission from the headlight has been performed with a light distribution pattern without a restriction on illumination of a pedestrian for the predetermined time period or longer after the pedestrian detection unit detected the pedestrian in the predetermined area ahead of the vehicle is set as the predetermined condition, whereby it can be adequately assumed that the driver is aware of the pedestrian because the pedestrian has been illuminated for a sufficient time period.

According to a third aspect of the embodiment, the light distribution controller according to the first aspect further includes an animal detection unit that detects presence or absence of an animal in a travel area ahead of the vehicle and left and right adjacent areas of the travel area on the basis of the image captured by the image capture unit. The illumination controller causes the headlight to be lit with a first light distribution pattern having no restrictions on illumination of a front area when the animal detection unit does not detect an animal in the travel area and the adjacent areas, causes the headlight to be lit with a second light distribution pattern including illumination of legs of an animal when the animal detection unit detects the animal in the travel area, and causes the headlight to be lit with a third light distribution pattern including illumination of the entire body of an animal coming from one of the adjacent areas to the travel area when the animal detection unit detects the animal.

According to the third aspect, light distribution to an animal is controlled in accordance with the current position and the movement direction of the animal, causing the movement of the animal to be adequately guided so that the driving of the vehicle is less affected by the animal.

BRIEF DESCRIPTION OF THE DRAWINGS

The advantages of the disclosure will become apparent in the following description taken in conjunction with the following drawings.

DETAILED DESCRIPTION

Figure 1:
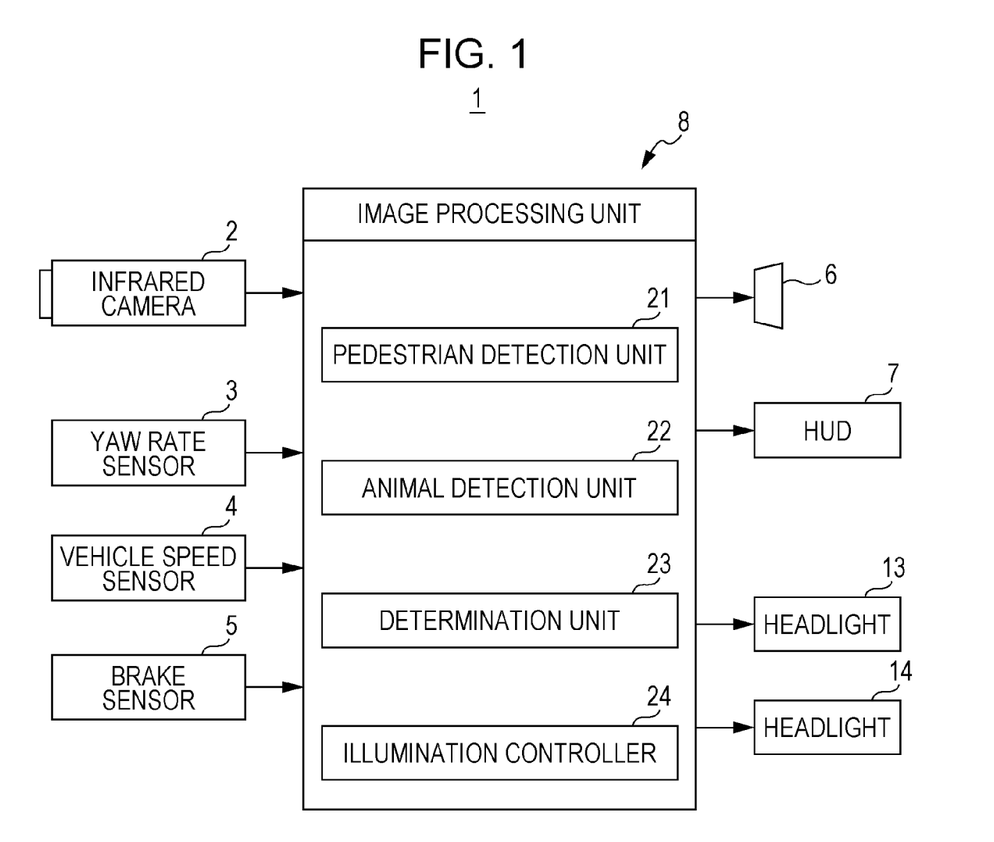
FIG. 1 is a diagram illustrating the configuration of a vehicle-surroundings monitoring apparatus.

Referring to FIG. 1, a vehicle-surroundings monitoring apparatus 1 includes a function for a light distribution controller as one function thereof. The vehicle-surroundings monitoring apparatus 1 includes an infrared camera 2 which can detect far-infrared rays, a yaw rate sensor 3 which detects the yaw rate of the vehicle, a vehicle speed sensor 4 which detects the traveling speed of the vehicle, a brake sensor 5 which detects an amount of the brake operation performed by the driver, an image processing unit 8 which detects a monitored object such as a pedestrian ahead of the vehicle on the basis of an image obtained from the infrared camera 2 and which outputs a warning when there is a high possibility of the monitored object being hit by the vehicle, a speaker 6 for giving a sound warning, a head-up display (hereinafter, referred to as an HUD) 7 for displaying an image obtained by the infrared camera 2 and also performing display for causing the driver to visually recognize the monitored object which is highly possibly hit by the vehicle, and left and right headlights 13 and 14.

Figure 2:
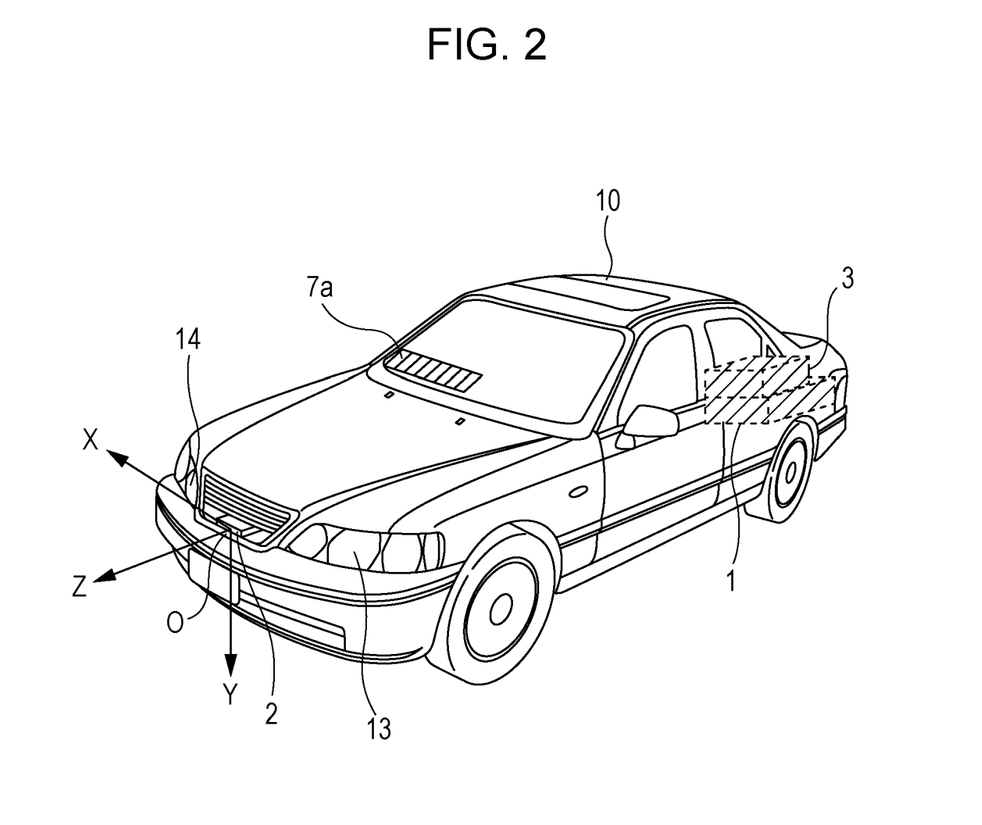
FIG. 2 is a diagram for describing how to attach the vehicle-surroundings monitoring apparatus illustrated in FIG. 1 to a vehicle.

With reference to FIG. 2, the infrared camera 2 is disposed at the center in the left-right direction in the front of a vehicle 10, and outputs, at certain time intervals, a captured image having a characteristic in which, the higher the temperature of a captured object is, the higher the output level is (the higher the brightness is). The infrared camera 2 corresponds to "an image capture unit that is mounted on a vehicle and that generates a captured image of an area ahead of the vehicle". The HUD 7 is disposed in such a manner that a screen 7a is displayed at a front position on the driver side of the front window of the vehicle 10.

A visible light camera may be used instead of the infrared camera 2. An image portion for a man or an animal in an image captured by using a visible light camera may be extracted on the basis of a particular color, a color contour, and a movement obtained from images captured in a time-series manner, which are detected from the image captured by using the visible light camera.

The left and right headlights 13 and 14 are disposed at the left and the right in the front of the vehicle 10, respectively, and enable free adjustment of the light distribution pattern with which an area ahead of the vehicle is illuminated. The light distribution of the headlights is freely adjustable. The specific light distribution mechanism for the headlights 13 and 14 is not illustrated. Various mechanisms which are already known by a person skilled in the art may be employed as the light distribution mechanism. Examples of the specific light distribution mechanism for the headlights 13 and 14 include a mechanism of changing the angle of a concave reflecting mirror in a headlight (see Japanese Patent No. 3747738 (U.S. Pat. No. 6,843,588) and Japanese Unexamined Utility Model Registration Application Publication No. 60-61942, the entire contents of which are incorporated herein by reference), a mechanism of changing the orientation of the headlights 13 and 14 along with the casings, a mechanism of relatively changing the positions of the condenser lens and the diffusion lens which are disposed ahead of the light source (see Japanese Examined Utility Model Registration Application Publication No. 8-6326, the entire contents of which are incorporated herein by reference), and a mechanism of performing scanning using reflected light in the up-down and left-right directions by projecting a light beam from the laser source to a reflection unit and by vibrating the reflection unit to and from in the up-down and left-right directions (see Japanese Unexamined Patent Application Publication No. 2009-48786 (U.S. Pat. No. 7,575,352), the entire contents of which are incorporated herein by reference).

X, Y, and Z coordinate axes are defined for the real space ahead of the vehicle 10. The origin O is located at the center position of the infrared camera 2. The Z axis extends in the front-rear horizontal direction of the vehicle 10, and the front side thereof indicates the positive side. The X axis extends in the left-right horizontal direction of the vehicle 10, and the right side thereof indicates the positive side. The Y axis extends in the vertical direction, and the down side thereof indicates the positive side.

The origin O of the X-Y-Z coordinate system may be set at the center in the left-right direction of the vehicle 10, and the infrared camera 2 may be located at a position obtained by shifting the center position in the left-right direction of the vehicle 10 to the left or right, or upward or downward. In this case, the real space position (X-Y-Z coordinate position) of an object which is described below is obtained by correcting the position obtained from a captured image, in accordance with the distance between the origin O and the center of the lens of the infrared camera 2.

The image processing unit 8 has a function of converting an analog image signal which is output from the infrared camera 2, into digital data, storing the digital data into an image memory (not illustrated), and performing various computations on the image of an area ahead of the vehicle which is stored in the image memory.

With reference to FIG. 1, the image processing unit 8 includes a pedestrian detection unit 21, an animal detection unit 22, a determination unit 23, and an illumination controller 24. The image processing unit 8 is an electronic unit constituted by, for example, a CPU and a memory. The functions of the pedestrian detection unit 21, the animal detection unit 22, the determination unit 23, and the illumination controller 24 are achieved by causing the CPU of the image processing unit 8 to execute programs for monitoring vehicle surroundings.

The pedestrian detection unit 21, the animal detection unit 22, the determination unit 23, and the illumination controller 24 will be described in detail in the description below with reference to, for example, FIG. 3. Therefore, brief description for these units will be made with reference to FIG. 1.

The pedestrian detection unit 21 detects a pedestrian in a predetermined area ahead of the vehicle 10 on the basis of an image captured using the infrared camera 2. The animal detection unit 22 detects the presence or absence of an animal in a travel area 32 (see FIG. 7) ahead of the vehicle 10 and left and right adjacent areas 47 and 48 (see FIG. 7) of the travel area 32 on the basis of an image captured using the infrared camera 2. The determination unit 23 determines whether or not the driver is aware of a pedestrian in the predetermined area when the pedestrian detection unit 21 has detected the pedestrian in the predetermined area, on the basis of whether or not a predetermined condition is satisfied.

The illumination controller 24 causes the headlights 13 and 14 to be lit with a light distribution pattern having no restrictions on illumination of the pedestrian, until the determination unit 23 determines that the driver is aware of the pedestrian in the predetermined area. In contrast, the illumination controller 24 causes the headlights 13 and 14 to be lit with a light distribution pattern having a restriction on illumination of body members including at least the eyes of the pedestrian, after the determination unit 23 determines that the driver is aware of the pedestrian in the predetermined area.

In addition, when the animal detection unit 22 has not detected living bodies including a man and an animal, the illumination controller 24 causes the headlights 13 and 14 to be lit with a first light distribution pattern having no restrictions on illumination of the front area. When the animal detection unit 22 has detected an animal in the travel area 32 ahead of the vehicle, the illumination controller 24 causes the headlights 13 and 14 to be lit with a second light distribution pattern which excludes illumination of the entire body of the animal and which includes illumination of the legs of the animal. When the animal detection unit 22 has detected an animal that is coming from the adjacent area 47 or 48 into the travel area 32, the illumination controller 24 causes the headlights 13 and 14 to be lit with a third light distribution pattern which excludes illumination of the legs of the animal and which includes illumination of the entire body of the animal.

According to the flowchart in FIG. 3, the procedure of the light distribution control performed by the image processing unit 8 will be described. The procedure in FIG. 3 is started at certain time intervals in synchronization with the timing at which the infrared camera 2 outputs an infrared image.

In STEP 1, the image processing unit 8 receives an infrared image signal from the infrared camera 2. The infrared camera 2 captures an image of the front view from the vehicle 10 at a predetermined angle of view at certain time intervals, and outputs an infrared image signal corresponding to the captured image.

In STEP 2, the image processing unit 8 stores, in the image memory, a gray-scale image obtained by converting the infrared image signal (analog signal) into digital gradation (brightness) data.

The gray-scale image is stored in the image memory as one of the time-series gray-scale images corresponding to the predetermined number of latest infrared images captured at certain time intervals by the infrared camera 2. Therefore, the time-series gray-scale images stored in the image memory are updated every time the infrared camera 2 outputs a new captured image after a certain time period elapses.

In STEP 3, the image processing unit 8 obtains a binarized image by performing binarization on each of the pixels of the gray-scale image. In the binarization, a pixel having a brightness equal to or higher than a predetermined threshold is regarded as a high-brightness pixel and is set to "1" (white), whereas a pixel having a brightness lower than the predetermined threshold is regarded as a low-brightness pixel and is set to "0" (black).

In STEP 4, the image processing unit 8 calculates run-length data which indicates the start pixel position and the length of a pixel row having continuous white pixels in the horizontal direction (the left-right direction of the binarized image), for each of the positions in the vertical direction (the up-down direction of the binarized image) in white image portions in the binarized image.

In STEP 5, the image processing unit 8 extracts white image portions as binarized images for objects on the basis of the run-length data of the binarized image, and labels (numbers) the extracted white image portions.

In STEP 6, the image processing unit 8 calculates the centroid and the area of each of the labeled white image portions, and an aspect (length-to-width) ratio of the circumscribing rectangle for each of the white image portions.

In STEP 7, the image processing unit 8 performs time-series tracking for an object. Specifically, the image processing unit 8 uses the latest and previous labeled white image portions extracted from the latest and previous binarized images obtained from the latest and previous infrared images captured by the infrared camera 2 at a certain time interval, and associates the latest and previous white image portions for the same object with each other on the basis of the correlation. At that time, the image processing unit 8 regards the latest and previous white image portions in which differences between the centroids of the white image portions, the areas of the white image portions, and the aspect (length-to-width) ratios of the circumscribing rectangles for the white image portions are within respective predetermined thresholds, as having a predetermined correlation, and determines that the latest and previous white image portions are image portions for the same object.

In STEP 7, the image processing unit 8 labels the latest white image portion again for each set of the latest and previous white image portions which are determined to be for the same object, in such a way that the latest white image portion inherits the label attached to the previous white image portion.

In STEP 8, the image processing unit 8 extracts a white image portion for a living-body object from the labeled white image portions that are labeled again in STEP 7.

In STEP 9, the image processing unit 8 determines whether or not a living-body object is present in an area ahead of the vehicle 10 on the basis of whether or not a living-body object is extracted in STEP 8. If a living-body object is present, the process proceeds to STEP 11. If a living-body object is not present, the process proceeds to STEP 10.

A living body has a temperature higher than that of the surroundings, whereas a general structure has a temperature lower than that of a living body. Therefore, a general structure is not extracted as a white image portion in a binarized image. However, some structures may have a temperature higher than a predetermined temperature and are extracted as white image portions in a binarized image. In the white image portions, a living body and a structure can be identified on the basis of, for example, the shape, the aspect ratio, and the brightness dispersion (a living body has small brightness dispersion).

In STEP 10, the image processing unit 8 sets the light distribution pattern for the headlights 13 and 14 to the default. The default light distribution pattern for the headlights 13 and 14 is the light distribution pattern which has no restrictions on illumination in a particular direction and with which an area ahead of the vehicle 10 is uniformly illuminated.

In STEP 11, the image processing unit 8 calculates the real space position of a living-body object. The real space position of the living-body object is used in the processes described below with reference to FIGS. 6 and 7 to detect an area in which the living-body object is present.

When the real space position of a pedestrian is calculated, for example, Expression (1) is used. The detail of the expression is described in, for example, Japanese Unexamined Patent Application Publication No. 2008-113296 (U.S. Pat. No. 7,925,050), the entire contents of which are incorporated herein by reference.

$$Z = \text{Rate} \cdot V \cdot \Delta t / (1 - \text{Rate}) \quad (1)$$

The reference characters in Expression (1) described above are defined as follows.
Z: A position of an object in the Z axis direction in FIG. 2. That is, a distance from the vehicle 10 to the object.
Rate: A dimensional ratio of the widths or the heights of the circumscribing rectangles of white image portions that are determined to be for the same object through the time-series tracking performed on the latest and previous binarized images in STEP 7. The expression Rate=w1/w0 or h1/h0 is used where the width and the height of the circumscribing rectangle in the latest binarized image are represented by w0 and h0, and the width and the height of the circumscribing rectangle in the previous binarized image are represented by w1 and h1. The dimensions h0, h1, w0, and w1 are represented using the number of pixel pitches in an infrared image.
Δt: A time difference between the time points for imaging the infrared images which are the origins of the latest and previous binarized images.
V: A vehicle speed of the vehicle 10.

The value Z obtained through Expression (1) is corrected using a turn angle of the vehicle 10. The turn angle of the vehicle 10 is calculated on the basis of an integrated value obtained by integrating the output of the yaw rate sensor 3 with respect to Δt. The calculation method described in, for example, Japanese Unexamined Patent Application Publication No. 2008-113296 (U.S. Pat. No. 7,925,050) described above may be used, the entire contents of which are incorporated herein by reference.

Furthermore, X and Y are calculated by using Expressions (2) and (3).

$$X = (x \cdot Z) / f \quad (2)$$

$$Y = (y \cdot Z) / f \quad (3)$$

The x, y, and f are defined as follows.
x, y: The x and y coordinates which correspond to the centroid of an object image portion in a binarized image and which are represented in terms of a pixel pitch. The origin o of the x-y coordinates corresponds to the origin O of the X-Y-Z coordinates in FIG. 2.
f: A focal length of the lens of the infrared camera 2 which is represented in terms of the number of pixel pitches.

Figure 3:
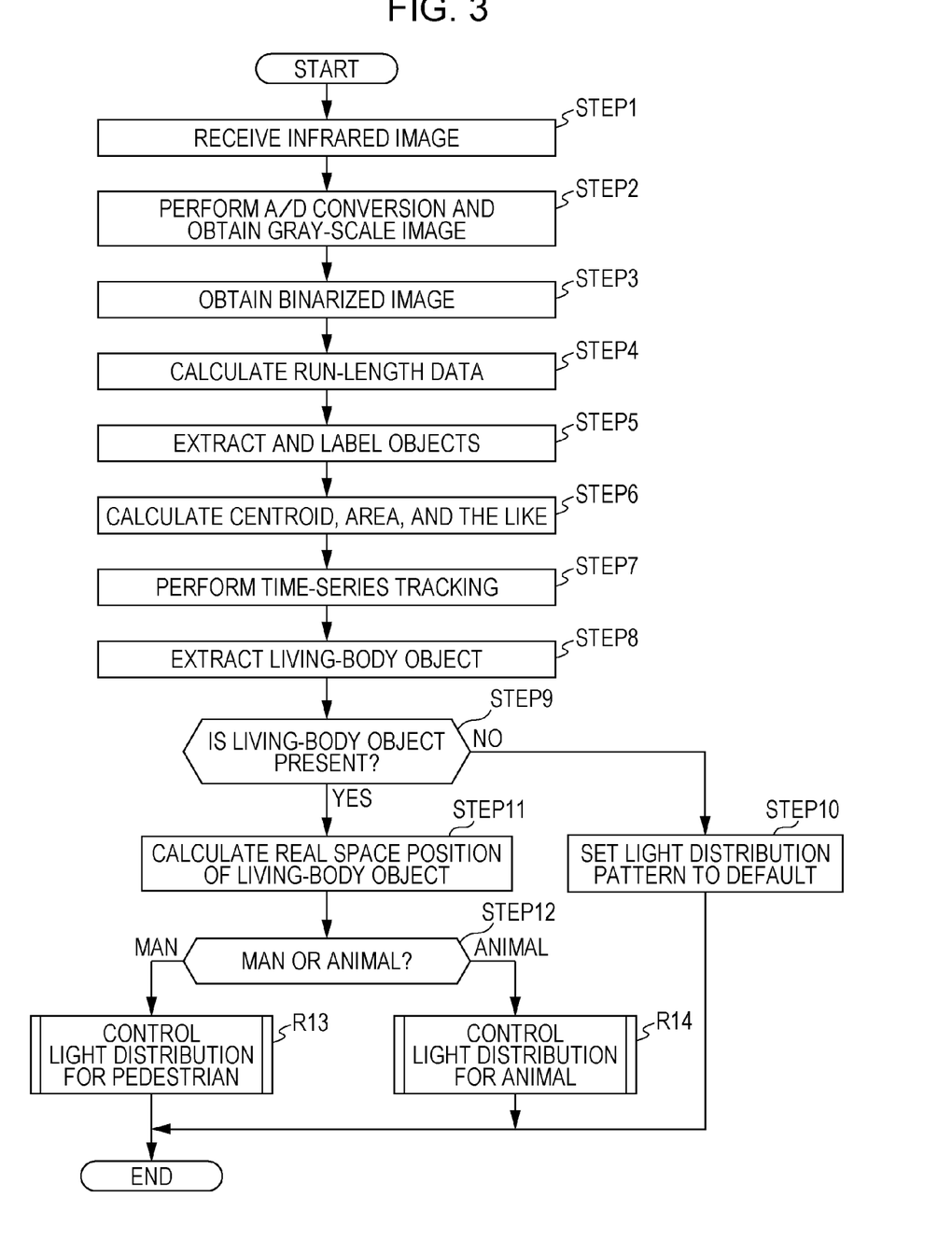
FIG. 3 is a flowchart of a living-body detection process performed by an image processing unit.

In STEP 12 in FIG. 3, the image processing unit 8 determines whether the living-body object is a man or an animal. It can be determined whether a white image portion representing a living body is a man or an animal, on the basis of, for example, the shape or the aspect ratio. The shape of a man is vertically oriented, whereas the shape of an animal is horizontally oriented. If the image processing unit 8 determines that the living-body object is a man in STEP 12, the process proceeds to ROUTINE 13 (light-distribution control routine for a pedestrian). If the image processing unit 8 determines that the living-body object is an animal, the process proceeds to ROUTINE 14 (light-distribution control routine for an animal).

Figure 4:
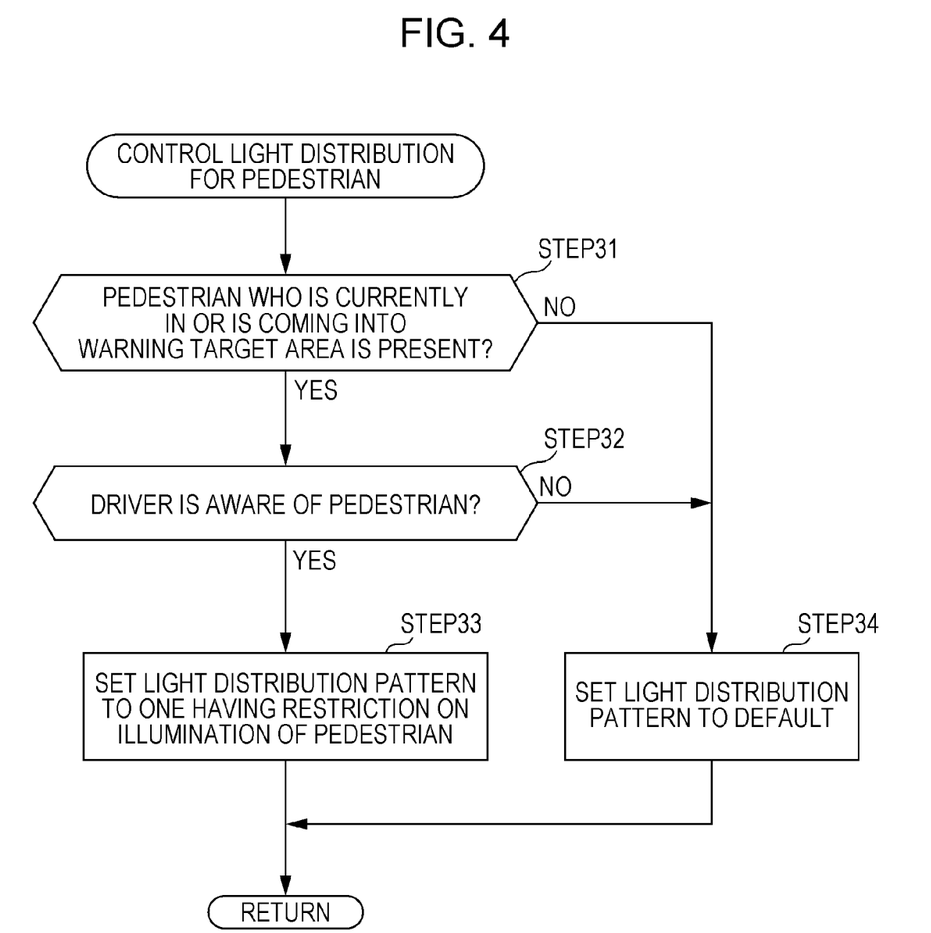
FIG. 4 is a flowchart of a light-distribution control routine for a pedestrian.
Figure 5:
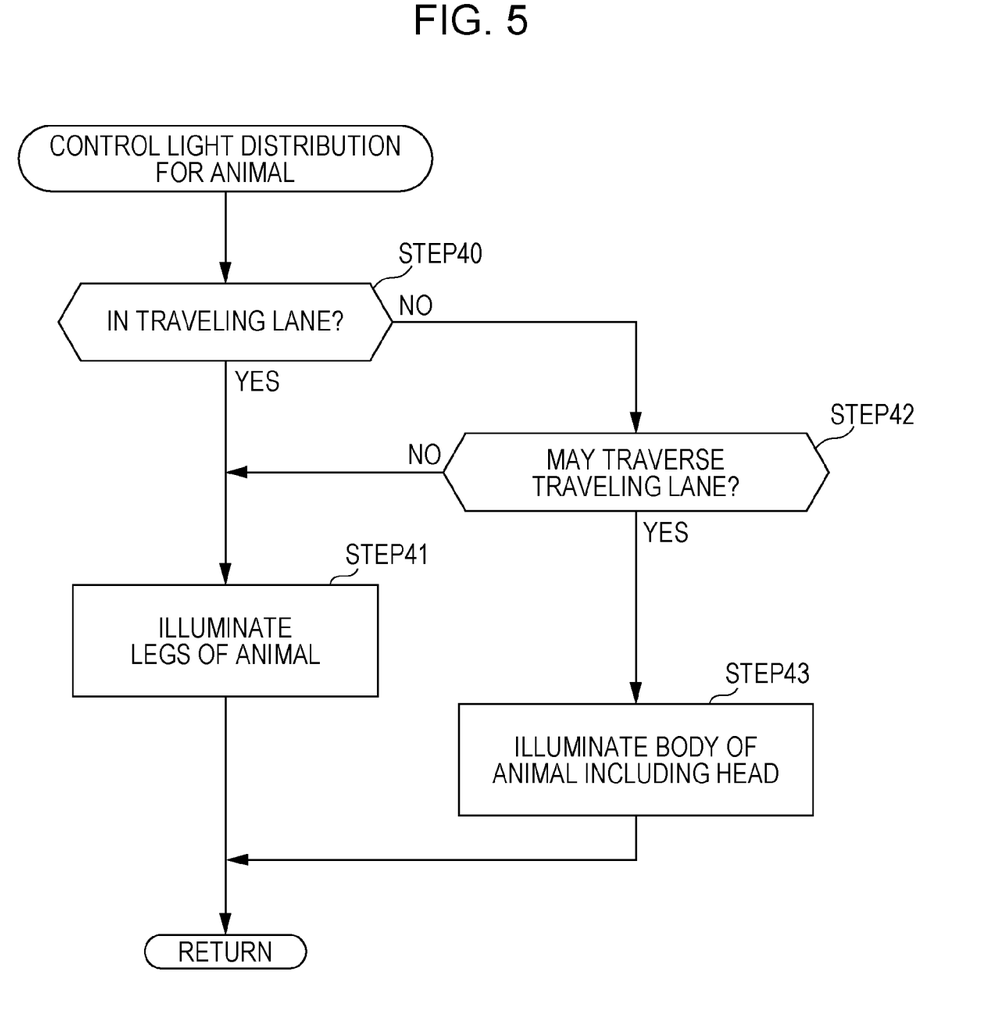
FIG. 5 is a flowchart of a light-distribution control routine for an animal.

The process in ROUTINE 13 involves the pedestrian detection unit 21, the determination unit 23, and the illumination controller 24. The process in ROUTINE 14 involves the animal detection unit 22, the determination unit 23, and the illumination controller 24. FIG. 4 and FIG. 5 are flowcharts for ROUTINE 13 and ROUTINE 14, respectively.

Before the process of ROUTINE 13 is described in detail with reference to FIG. 4, a warning range for a pedestrian will be described with reference to FIG. 6.

Figure 6:
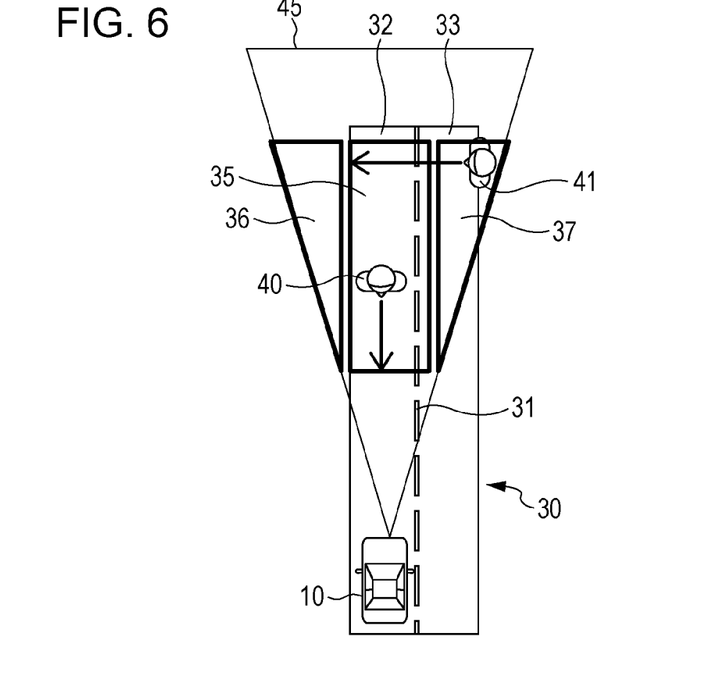
FIG. 6 is a diagram for describing a warning range for a pedestrian.

In FIG. 6, a road 30 is divided into the traveling lane 32 (travel area) and an oncoming-car lane 33 which are on the left and the right of a center line 31. The vehicle 10 is traveling on the traveling lane 32 (travel area) which is on the left of the center line 31 viewed from the driver. The Z axis in FIG. 2 extends forward along the left-right symmetric line of the vehicle 10 in FIG. 6, and an isosceles triangle 45 is formed in such a manner that its left-right symmetric center line matches the Z axis and that its vertex is set to the origin O (see FIG. 2). The two equal sides of the isosceles triangle 45 correspond to the angle of view of the infrared camera 2.

An incoming object determination area 35, a left approaching determination area 36, and a right approaching determination area 37 are defined in the inside of the isosceles triangle 45 in such a manner as to have a predetermined length in the Z axis direction. The incoming object determination area 35 corresponds to a "predetermined area".

The length of the incoming object determination area 35 in the X axis direction is approximately the same as the width of the traveling lane 32 (travel area). In the case of detection of a man, the vehicle-surroundings monitoring apparatus 1 regards a pedestrian 40 who is in the incoming object determination area 35 and a pedestrian 41 who is in the left approaching determination area 36 or the right approaching determination area 37 and who may come into the incoming object determination area 35 as a warning target, and outputs a warning. Specific examples of a warning include a predetermined number of warning sounds which are output from the speaker 6, and display of a frame which has a conspicuous color such as yellow and which surrounds an image portion for a man which is included in the gray-scale image on the screen 7a.

In FIG. 6, the pedestrian 40 is walking in the incoming object determination area 35. In addition, although the pedestrian 41 is currently in the right approaching determination area 37, it is sufficiently possible for the pedestrian 41 to come into the incoming object determination area 35 by the time when the vehicle 10 gets closer to the pedestrian 41. Therefore, both of the pedestrian 40 and the pedestrian 41 are targets for warning performed by the vehicle-surroundings monitoring apparatus 1. The light distribution control function for a man performed by the vehicle-surroundings monitoring apparatus 1 is performed on a man who is to be regarded as a warning target.

In STEP 31, the pedestrian detection unit 21 determines whether or not a pedestrian regarded as a warning target is present, that is, a pedestrian is currently in the incoming object determination area 35, or is currently in the left approaching determination area 36 or the right approaching determination area 37 and is coming into the incoming object determination area 35. If the determination result is YES, the process proceeds to STEP 32. If the determination result is NO, the process proceeds to STEP 34.

In STEP 32, the determination unit 23 determines whether or not the driver is aware of the pedestrian regarded as a warning target. If it is determined that the driver is aware of the pedestrian, the process proceeds to STEP 33. If it is determined that the driver is not aware of the pedestrian, the process proceeds to STEP 34.

The determination unit 23 determines whether or not the driver is aware of the pedestrian regarded as a warning target, through satisfaction of, for example, any one of the following conditions (which corresponds to a "predetermined condition").

(a) The driver releases the accelerator pedal or depresses the brake pedal, and the speed of the vehicle 10 decreases. An operation of depressing the brake pedal can be detected from the output of the brake sensor 5. A decrease in the speed of the vehicle 10 can be detected from the output of the vehicle speed sensor 4. These driving operations each correspond to a "predetermined driving operation".

(b) The illumination using the headlights 13 and 14 has been performed with the default light distribution pattern (in STEP 34 described below) for a predetermined time period or longer after the pedestrian detection unit 21 detected a pedestrian regarded as a warning target (which corresponds to "a second condition that light emission from a headlight has been performed with a light distribution pattern without a restriction on illumination of a pedestrian for a predetermined time period or longer after a pedestrian detection unit detected a pedestrian in a predetermined area ahead of a vehicle").

(c) The eyes of the driver are turned to a pedestrian regarded as a warning target. A fact that the eyes of the driver are turned to a pedestrian regarded as a warning target can be detected through the output of a camera for line-of-sight detection (not illustrated).

In STEP 33, the illumination controller 24 sets the illumination using the headlights 13 and 14 to a light distribution pattern having a restriction on illumination of a pedestrian. The restriction on illumination in STEP 33 is such that light emission is to be performed with a light distribution pattern with which the pedestrian is not dazzled by the glare from the headlights 13 and 14, and in detail with which the illumination light from the headlights 13 and 14 does not hit the eyes of the pedestrian. The illumination controller 24 performs light emission with a restriction on illumination by controlling the orientation of the reflecting surfaces of the headlights 13 and 14, or the scanning range of a light beam from a scanning headlight.

Even when the execution of the operation in STEP 33 causes the upper half of the body of the pedestrian not to be lit by the headlights 13 and 14, the driver can recognize the presence of the entire pedestrian from the image portion for the pedestrian which is surrounded by a frame and which is in the gray-scale image in the screen 7a, by visually checking the screen 7a.

In STEP 34, the illumination controller 24 sets the light distribution pattern for the headlights 13 and 14 to the default as in STEP 10.

Figure 7:
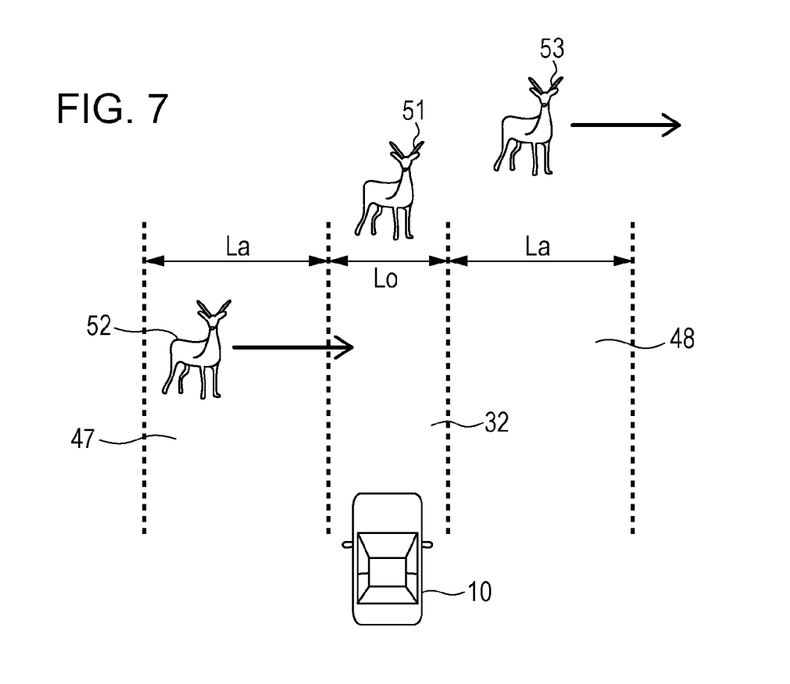
FIG. 7 is a diagram for describing an area associated with light distribution to an animal.

Before the process of ROUTINE 14 is described in detail with reference to FIG. 5, areas related to light distribution to an animal will be described with reference to FIG. 7. In FIG. 7, the travel area 32 has a width of Lo/2 on each of the left and the right with respect to a line obtained by extending the left-right symmetric line of the vehicle 10 forward. The symbol Lo represents a length which is approximately the same as the lane width of the road on which the vehicle 10 travels. The left adjacent area 47 and the right adjacent area 48 are adjacent to the left side and the right side of the travel area 32, respectively, and the widths thereof each are set to a width La (La>Lo).

FIG. 7 illustrates three states involving an animal. An animal in FIG. 7 is assumed to be a relatively large animal such as a deer. An animal 51 is currently in the travel area 32. An animal 52 is currently in the left adjacent area 47, and is coming into the travel area 32. An animal 53 is currently in the right adjacent area 48 and is going away from the travel area 32.

Upon detection of the animals 51 to 53 being present in the travel area 32, the left adjacent area 47, or the right adjacent area 48, regardless of the movement directions of the animals 51 to 53, the vehicle-surroundings monitoring apparatus 1 outputs a warning. As in the case for the pedestrian 40, specific examples of a warning about the animal 51 include a predetermined number of warning sounds which are output from the speaker 6, and display of a frame which has a conspicuous color such as yellow and which surrounds an image portion for an animal which is included in the gray-scale image on the screen 7a.

In the flowchart in FIG. 5 which will be described next, the process in STEP 41 is performed on the animals 51 and 53, and the process in STEP 43 is performed on the animal 52.

In STEP 40 in FIG. 5, the animal detection unit 22 determines whether or not an animal is present in the traveling lane which is the travel area 32. If it is determined that an animal is present, the process proceeds to STEP 41. If it is determined that an animal is not present, the process proceeds to STEP 42.

In STEP 41, the illumination controller 24 controls the illumination light from the headlights 13 and 14 so that, instead of illumination of the animal body, the legs of the animal are illuminated. The reason is that an animal generally has a tendency to stop moving when the head of the animal is illuminated. Therefore, illumination of the legs is effective to promote a rapid movement of the animal. Accordingly, the light emission with the light distribution pattern as in STEP 41 causes the animals 51 and 53 to move and go away from the travel area 32.

In STEP 42, the animal detection unit 22 determines whether or not it is possible for an animal to traverse the traveling lane which is the travel area 32. If it is determined that it is possible, the process proceeds to STEP 43. If it is determined that it is not possible, the process proceeds to STEP 41.

In STEP 43, the illumination controller 24 controls the illumination light from the headlights 13 and 14 so that the body of the animal including the head (including the face) is illuminated. An animal generally stops moving when the head is illuminated. Therefore, by illuminating the head of the animal 52 with the illumination light from the headlights 13 and 14, the movement of the animal 52 from the left adjacent area 47 to the travel area 32 can be prevented.

The description about the exemplary embodiment is made. However, an embodiment is not limited to the above in the description. Various modifications can be made within the scope of the gist of the embodiment. For example, according to the exemplary embodiment, the distance (Z coordinate) to a living body is calculated on the basis of a change in dimensions of white image portions extracted in the time-series manner from images captured by the single infrared camera 2.

Alternatively, the distance may be calculated on the basis of a parallax between two infrared cameras 2.

According to the exemplary embodiment, light emission is performed with a light distribution pattern having a restriction on illumination, on all of the pedestrians in the incoming object determination area 35 (in STEP 33 in FIG. 4). Alternatively, it may be determined whether or not a pedestrian faces the vehicle 10, and light emission may be performed with a light distribution pattern having a restriction on illumination, only on the pedestrian facing the vehicle 10, whereas light emission may be performed with the default light distribution pattern on a pedestrian whose back is toward the vehicle 10.

According to the exemplary embodiment, the state in which a pedestrian or an animal is present is described. Alternatively, when both a pedestrian and an animal are present at the same time, the vehicle-surroundings monitoring apparatus 1 may prioritize the light distribution control for a pedestrian.

We claim:

1. A light distribution controller comprising:
   a headlight lighting an area ahead of a vehicle in such a manner that light distribution of the headlight is freely adjustable;
   an image capture unit mounted on the vehicle and generating a captured image of the area ahead of the vehicle;
   a pedestrian detector configured to detect a pedestrian in a predetermined area ahead of the vehicle on the basis of the image captured by the image capture unit;
   a determiner configured to determine whether or not a driver is aware of the pedestrian in the predetermined area on the basis of whether or not a predetermined condition is satisfied, when the pedestrian detector has detected the pedestrian in the predetermined area; and
   an illumination controller that causes the headlight to be lit with a light distribution pattern having no restrictions on illumination of the pedestrian until the determiner determines that the driver is aware of the pedestrian in the predetermined area even if the pedestrian detector has detected the pedestrian in the predetermined area, and that causes the headlight to be lit with a light distribution pattern having a restriction on illumination of a body member including at least an eye of the pedestrian after the determiner determines that the driver is aware of the pedestrian in the predetermined area,
   wherein the predetermined condition is that the driver releases an accelerator pedal of the vehicle or depresses a brake pedal of the vehicle when the pedestrian detector has detected the pedestrian in the predetermined area.

2. The light distribution controller according to claim 1, further comprising:
   an animal detector configured to detect presence or absence of an animal in a travel area ahead of the vehicle and left and right adjacent areas of the travel area on the basis of the image captured by the image capture unit,
   wherein the illumination controller causes the headlight to be lit with a first light distribution pattern having no restrictions on illumination of the area ahead of the vehicle when the animal detector does not detect the animal in the travel area and the adjacent areas, causes the headlight to be lit with a second light distribution pattern limiting illumination to a leg of the animal when the animal detector detects the animal in the travel area, and causes the headlight to be lit with a third light distribution pattern including illumination of the entire body of the animal when the animal detector detects the animal and determines that the detected animal is coming to the travel area from one of the adjacent areas.

3. A light distribution controlling method comprising:
   (a) capturing and generating an image of an area ahead of a vehicle;
   (b) detecting, by a computer, a pedestrian in a predetermined area ahead of the vehicle on the basis of the captured image;
   (c) determining, by a computer, whether or not a driver is aware of the pedestrian in the predetermined area on the basis of whether or not a predetermined condition is satisfied, when the pedestrian has been detected in the predetermined area; and
   (d) controlling, by a computer, a headlight lighting the area ahead of the vehicle with freely adjustable light distribution, to cause the headlight to be lit with a light distribution pattern having no restrictions on illumination of the pedestrian until it is determined that the driver is aware of the pedestrian in the predetermined area even if the pedestrian has been detected in the predetermined area, and to cause the headlight to be lit with a light distribution pattern having a restriction on illumination of a body member including at least an eye of the pedestrian after it is determined that the driver is aware of the pedestrian in the predetermined area,
   wherein the predetermined condition is that the driver releases an accelerator pedal of the vehicle or depresses a brake pedal of the vehicle when the pedestrian has been detected in the predetermined area.

4. A light distribution controller comprising:
   a headlight means for lighting an area ahead of a vehicle in such a manner that light distribution of the headlight is freely adjustable;
   an image capture means mounted on the vehicle and for generating a captured image of the area ahead of the vehicle;
   a pedestrian detection means for detecting a pedestrian in a predetermined area ahead of the vehicle on the basis of the image captured by the image capture means;
   a determination means for determining whether or not a driver is aware of the pedestrian in the predetermined area on the basis of whether or not a predetermined condition is satisfied, when the pedestrian detection means has detected the pedestrian in the predetermined area; and
   an illumination controlling means for causing the headlight means to be lit with a light distribution pattern having no restrictions on illumination of the pedestrian until the determination means determines that the driver is aware of the pedestrian in the predetermined area even if the pedestrian detection means has detected the pedestrian in the predetermined area, and for causing the headlight means to be lit with a light distribution pattern having a restriction on illumination of a body member including at least an eye of the pedestrian after the determination means determines that the driver is aware of the pedestrian in the predetermined area,
   wherein the predetermined condition is that the driver releases an accelerator pedal of the vehicle or depresses a brake pedal of the vehicle when the pedestrian detection means has detected the pedestrian in the predetermined area.

* * * * *